US012383379B2

(12) United States Patent
Hung

(10) Patent No.: US 12,383,379 B2
(45) Date of Patent: Aug. 12, 2025

(54) ORTHODONTIC DEVICE FOR PALATAL EXPANSION AND MANDIBULAR RETRACTION

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 386 days.

(21) Appl. No.: 17/895,699

(22) Filed: Aug. 25, 2022

(65) Prior Publication Data

US 2023/0064764 A1 Mar. 2, 2023

Related U.S. Application Data

(60) Provisional application No. 63/237,252, filed on Aug. 26, 2021.

(51) Int. Cl.
*A61C 7/10* (2006.01)
*A61C 7/14* (2006.01)
(Continued)

(52) U.S. Cl.
CPC ............... *A61C 7/10* (2013.01); *A61C 7/145* (2013.01); *A61C 7/16* (2013.01); *A61C 7/22* (2013.01); *A61C 7/303* (2013.01)

(58) Field of Classification Search
CPC ........................................ A61C 7/10
See application file for complete search history.

(56) References Cited

U.S. PATENT DOCUMENTS

D311,579 S * 10/1990 Collins, Jr. ................. D24/180
5,002,485 A 3/1991 Lipohar et al.
(Continued)

FOREIGN PATENT DOCUMENTS

CN 203915105 U 11/2014
CN 104000662 A 11/2017
(Continued)

OTHER PUBLICATIONS

DE19630858A1 (Foerster Rolf) (Foerster Bernhard Gmbh) Screw assembly for correction of misaligned teeth, Mar. 5, 1998 [retrieved on Jun. 10, 2025]. Translation retrieved from: Espacenet (Year: 1998).*

(Continued)

*Primary Examiner* — Eric J Rosen
*Assistant Examiner* — Courtney N Huynh
(74) *Attorney, Agent, or Firm* — McClure, Qualey & Rodack, LLP

(57) ABSTRACT

An orthodontic device is provided, including an anchorage structure, a palatal expansion structure, and at least one protrusion. The anchorage structure includes left and right posterior teeth caps configured to be removably worn on the posterior teeth of the maxillary dental arch; a palatal bar connecting the left and right posterior teeth caps; and an expanded arch extending from the left posterior teeth cap to the right posterior teeth cap. The palatal expansion structure includes: left and right anterior teeth parts configured to be removably worn on the anterior teeth of the maxillary dental arch; and expansion screws connecting the left anterior teeth part and the right anterior teeth part to each other and to the palatal bar. The at least one protrusion is formed on then occlusal side of the expanded arch and configured to contact the patient's mandibular dental arch when the orthodontic device is worn.

15 Claims, 10 Drawing Sheets

(51) Int. Cl.
    *A61C 7/16*     (2006.01)
    *A61C 7/22*     (2006.01)
    *A61C 7/30*     (2006.01)

(56) References Cited

U.S. PATENT DOCUMENTS

| | | | |
|---|---|---|---|
| 5,769,631 A | 6/1998 | Williams | |
| 2016/0278884 A1* | 9/2016 | Hung | A61C 7/36 |
| 2020/0060789 A1* | 2/2020 | Sachdeva | A61C 7/08 |
| 2020/0214804 A1 | 7/2020 | Aagaesen | |
| 2021/0369413 A1* | 12/2021 | Li | G16H 20/40 |

FOREIGN PATENT DOCUMENTS

| | | | | |
|---|---|---|---|---|
| DE | 19630858 A1 * | 3/1998 | | A61C 7/10 |
| EP | 3348225 A1 * | 7/2018 | | A61C 7/10 |
| JP | H 10-066702 A | 3/1998 | | |
| JP | 2002-191623 A | 7/2002 | | |
| JP | 2016523665 A | 8/2016 | | |
| JP | 6865483 B1 | 4/2021 | | |
| KR | 101343129 B1 * | 12/2013 | | A61C 7/28 |
| KR | 10-2019-0143049 A | 12/2019 | | |
| TW | 201703737 A | 2/2017 | | |
| TW | M602019 U | 10/2020 | | |

OTHER PUBLICATIONS

KR 101343129 B1 (Choeng Sang Youn) Tooth Correction Device, Dec. 20, 2013 [retrieved on Dec. 2, 2024] Translation retrieved from: Google Patents (Year: 2013).*
European Patent Office, Search Report, Patent Application No. 22192274.5, Jan. 10, 2023, Europe.
Taiwan Patent Office, Office Action, Patent Application No. 111131814, Feb. 15, 2023, Taiwan.
Japanese language office action dated Nov. 8, 2023, issued in application No. JP 2022-133624.
Korean language Notice of Allowance dated Feb. 5, 2025, issued in application No. KR 10-2022-0107091.
English language translation of Notice of Allowance issued in application No. KR 10-2022-0107091 (p. 1 of attachment).

* cited by examiner

ORTHODONTIC DEVICE FOR PALATAL EXPANSION AND MANDIBULAR RETRACTION

CROSS REFERENCE TO RELATED APPLICATIONS

This application claims the benefit of U.S. Provisional Application No. 63/237,252, filed on Aug. 26, 2021, the entirety of which is incorporated by reference herein.

BACKGROUND OF THE INVENTION

Field of the Invention

The present application relates in general to an orthodontic device, and in particular to an orthodontic device for expanding the upper jaw or maxilla and retracting the lower jaw or mandible (i.e., for palatal expansion and mandibular retraction) in order to establish proper occlusion.

Description of the Related Art

Misaligned teeth can adversely affect a person's dental aesthetics, functions, and health. The goal of orthodontic correction is to bring the teeth into proper alignment and occlusion by using appliances which exert mechanical forces to move the teeth to positions or orientations where the dental functions and aesthetics are improved.

FIGS. 1A and 1B show the before-treatment teeth model of an adult patient with severe Class III malocclusion. The teeth model shows conditions of an anterior open bite, a recessed maxilla, and a protruding mandible. The patient has a recessed maxilla that resulted from abnormal maxilla development. As shown in FIG. 1A, there is a horizontal gap G1 between the maxilla and mandible (e.g., between the vertical dashed lines), and as shown in FIG. 1B, there is a vertical gap G2 between the maxilla and mandible (e.g., between the horizontal dashed lines). Further, the patient suffers from muscle stiffness or muscle splinting. Due to the lack of anterior contact and canine protection, excessive lateral jaw movements can occur during mastication. Protective muscle splinting is the body's natural response to protect the jaw joints from excessive lateral jaw movements.

In such severe cases, doctors usually perform surgery on patients with a recessed maxilla and a protruding mandible. Therefore, it is desirable to provide non-surgical treatment for severe Class III malocclusion.

BRIEF SUMMARY OF INVENTION

In view of foregoing, an object the present invention is to provide a patient-removable orthodontic device for the treatment of severe Class III malocclusion, as an alternative to surgical treatment.

An embodiment of the invention provides an orthodontic device, including an anchorage structure, a palatal expansion structure, and at least one protrusion. The anchorage structure includes a left posterior teeth cap and a right posterior teeth cap configured to be removably worn on the left and right posterior teeth of a patient's maxillary dental arch, respectively. The anchorage structure also includes a palatal bar connecting the left posterior teeth cap and the right posterior teeth cap and configured to contact the patient's palate. The anchorage structure also includes an expanded arch connected to the left and right posterior teeth caps and extending from the left posterior teeth cap to the right posterior teeth cap. The palatal expansion structure includes a left anterior teeth part and a right anterior teeth part configured to be removably worn on the left and right anterior teeth of the patient's maxillary dental arch, respectively. The palatal expansion structure also includes a plurality of expansion screws connecting the left anterior teeth part and the right anterior teeth part to each other and to the palatal bar. The left and right posterior teeth caps, the palatal bar and the expanded arch transversely enclose the palatal expansion structure. The at least one protrusion is formed on the occlusal side of the expanded arch and configured to contact the patient's mandibular dental arch when the orthodontic device is worn.

In some embodiments, each of the left and right anterior teeth parts is movable between an initial position and a target position under forces driven by the expansion screws, and the expanded arch is configured to have a shape and relative position such that the lingual edge of the expanded arch contacts the front edges of the left and right anterior teeth parts at the target positions.

In some embodiments, the left and right anterior teeth parts are moved anteriorly and outwardly from the initial positions under the forces driven by the expansion screws, and the expanded arch is configured to stop the left and right anterior teeth parts at the target positions.

In some embodiments, the left and right posterior teeth caps, the palatal bar and the expanded arch are integrally formed in one piece.

In some embodiments, the expanded arch is located at the same elevation as the left and right posterior teeth caps.

In some embodiments, the at least one protrusion includes an incisor guidance protrusion that is formed on the expanded arch and configured to contact the incisors of the patient's mandibular dental arch when the orthodontic device is worn.

In some embodiments, the at least one protrusion includes two lateral protrusions that are formed on the expanded arch and configured to contact the left and right canines of the patient's mandibular dental arch when the orthodontic device is worn.

In some embodiments, the orthodontic device further includes a plurality of connectors provided on the expanded arch and the left and right anterior teeth parts. The connectors on the expanded arch and the left and right anterior teeth parts are used for connecting elastics to provide forces to drive the left and right anterior teeth parts.

In some embodiments, the orthodontic device further includes a plurality of connectors provided on the expanded arch. The connectors on the expanded arch are used for connecting elastics coupled to other connectors fixed on the lower teeth to provide forces to drive the patient's mandibular dental arch.

In some embodiments, the orthodontic device further includes a plurality of connectors provided on the left and right anterior teeth parts and the palatal bar. The connectors on the left and right anterior teeth parts and the palatal bar are used for connecting elastics to provide forces to drive the left and right anterior teeth parts.

Another embodiment of the invention provides an orthodontic device, including an anchorage structure, a palatal expansion structure, an incisor guidance protrusion and two lateral protrusions. The anchorage structure includes a left posterior teeth cap and a right posterior teeth cap configured to be removably worn on the left and right posterior teeth of a patient's maxillary dental arch, respectively. The anchorage structure also includes a palatal bar connecting the left posterior teeth cap and the right posterior teeth cap and configured to contact the patient's palate. The anchorage structure also includes an expanded arch connected to the left and right posterior teeth caps and extending from the left posterior teeth cap to the right posterior teeth cap. The palatal expansion structure includes a left anterior teeth part and a right anterior teeth part configured to be removably worn on the left and right anterior teeth of the patient's maxillary dental arch, respectively. The palatal expansion structure also includes a plurality of expansion screws connecting the left anterior teeth part and the right anterior teeth part to each other and to the palatal bar. The left and right posterior teeth caps, the palatal bar and the expanded arch transversely enclose the palatal expansion structure. The incisor guidance protrusion and lateral protrusions are formed on the occlusal side of the expanded arch and configured to contact the incisors and the left and right canines of the patient's mandibular dental arch, respectively, when the orthodontic device is worn.

In some embodiments, the contacting surfaces of the incisor guidance protrusion and the lateral protrusions are configured with guiding surfaces for the lower teeth.

In some embodiments, the left and right posterior teeth caps are configured to contact the left and right posterior teeth of the patient's mandibular dental arch, respectively, when the orthodontic device is worn, and the contacting surfaces of the left and right posterior teeth caps are also configured with guiding surfaces for the lower teeth.

In some embodiments, each of the left and right anterior teeth parts is movable between an initial position and a target position under forces driven by the expansion screws, and the expanded arch is configured to stop the left and right anterior teeth parts at the target positions.

In some embodiments, the anchorage structure and the left and right anterior teeth parts are made of orthodontic resin.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF INVENTION

In order to illustrate the purposes, features, and advantages of the invention, the preferred embodiments and drawings of the invention are shown in detail as follows. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

According to various embodiments of the present disclosure, a patient-removable orthodontic device is provided to expand the maxilla and retract the mandible in patients who suffer from abnormal maxilla growth and a protruding mandible. Advantageously, the orthodontic device provided can expand the maxilla anteriorly and outwardly and retract the mandible at the same time to reduce treatment time. The present invention enables a non-surgical treatment alternative.

Figure 2:
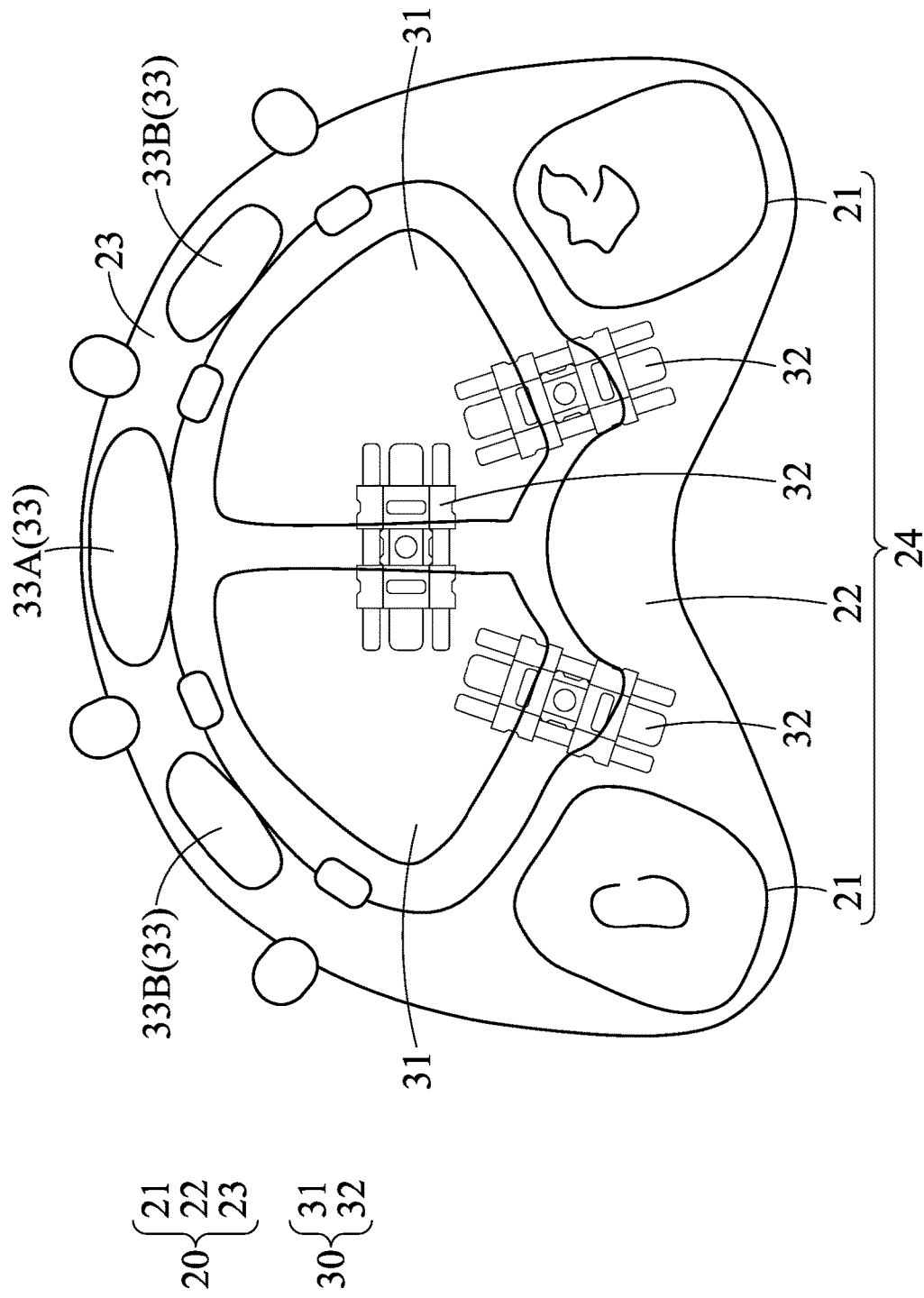
FIG. 2 is a schematic bottom view of an orthodontic device in accordance with some embodiments of the present disclosure.

FIG. 2 is a schematic bottom view of a patient-removable orthodontic device 10 in accordance with some embodiments. The patient-removable orthodontic device 10 (which may also be referred to as orthodontic device 10) is suitable for a patient to wear on the maxillary dental arch, and includes an anchorage structure 20 and a palatal expansion structure 30. The anchorage structure 20 includes two (i.e., left and right) posterior teeth caps 21, a palatal bar 22, and an expanded arch 23. The palatal expansion structure 30 includes two (i.e., left and right) anterior teeth parts 31 and three (orthodontic) expansion screws 32. The expansion screws 32 connect the left and right anterior teeth parts 31 to each other and to the palatal bar 22. The details of the expansion screw 32 are well known in the art and will not be repeated here. The expanded arch 23 is connected to the left and right posterior teeth caps 21 and extends from the left posterior teeth cap 21 to the right posterior teeth cap 21. The left and right posterior teeth caps 21 are connected by the palatal bar 22 to form a posterior teeth anchorage structure 24. In some embodiments, the expanded arch 23 and the posterior teeth anchorage structure 24 (i.e., the anchorage structure 20) are integrally formed in one piece.

As shown in FIG. 2, the expanded arch 23 and the posterior teeth anchorage structure 24 transversely enclose the palatal expansion structure 30. Also, it should be noted that the expanded arch 23 is located at substantially the same level (elevation) as the left and right posterior teeth caps 21 of the posterior teeth anchorage structure 24.

Figure 3:
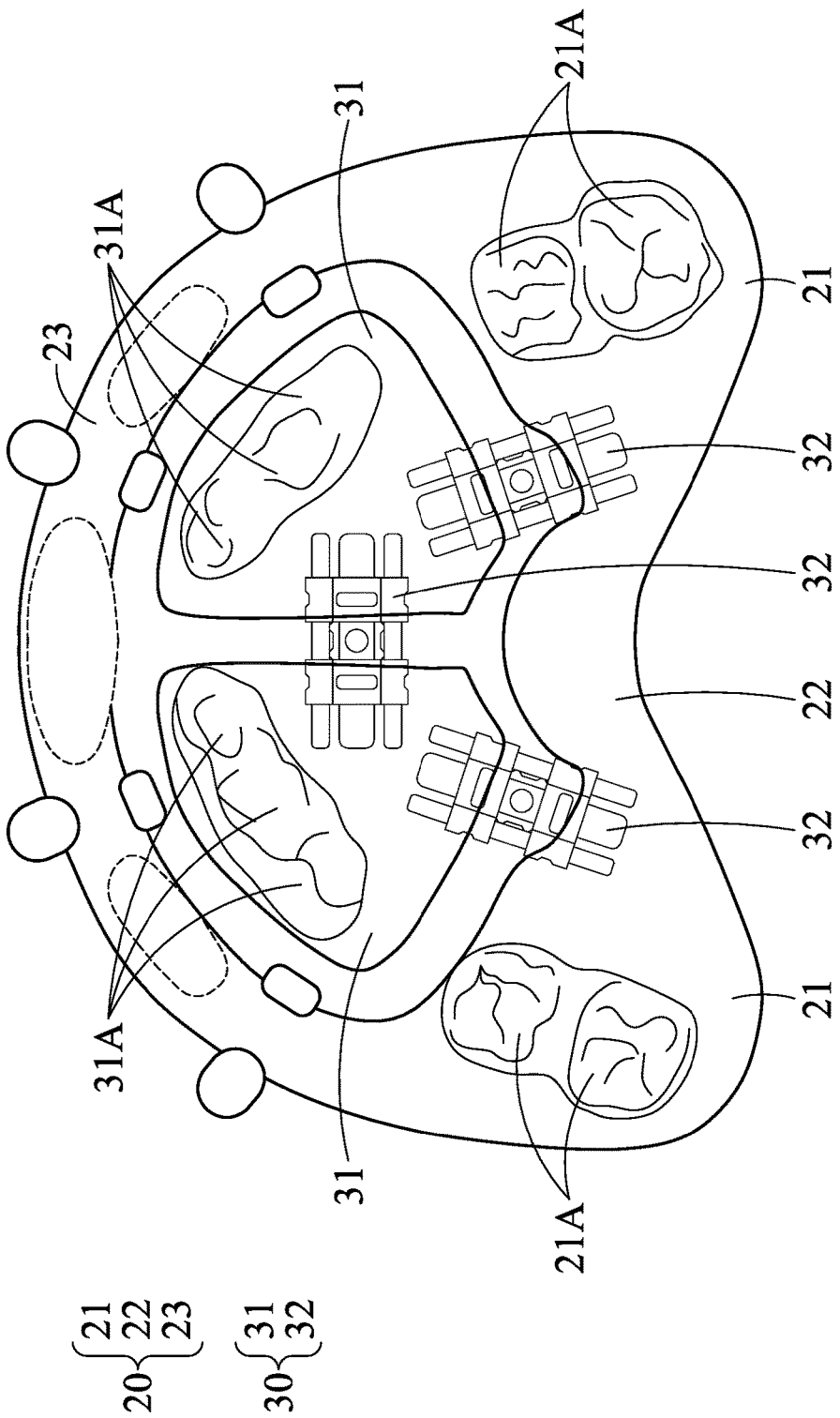
FIG. 3 is a schematic top view of an orthodontic device in accordance with some embodiments of the present disclosure.

FIG. 3 shows a top view of the same orthodontic device 10. As shown in FIG. 3, each posterior teeth cap 21 has cavities 21A to receive the maxillary posterior teeth, and each anterior teeth part 31 has cavities 31A to receive the maxillary anterior teeth. More specifically, when the orthodontic device 10 is worn on the maxillary dental arch, the left and right posterior teeth caps 21 are fitted or placed on the left and right posterior teeth, the left and right anterior teeth parts 31 are fitted or placed on the left and right anterior teeth, and those teeth are respectively received in the cavities 21A and 31A. In some embodiments, the anchorage structure 20 and the anterior teeth parts 31 are made of rigid biocompatible materials such as orthodontic resin. Any other material suitable for oral applications can also be used. In other embodiments, cavities 21A and 31A for receiving teeth may be lined with wax to improve the retention of the orthodontic device 10.

Figure 1A:
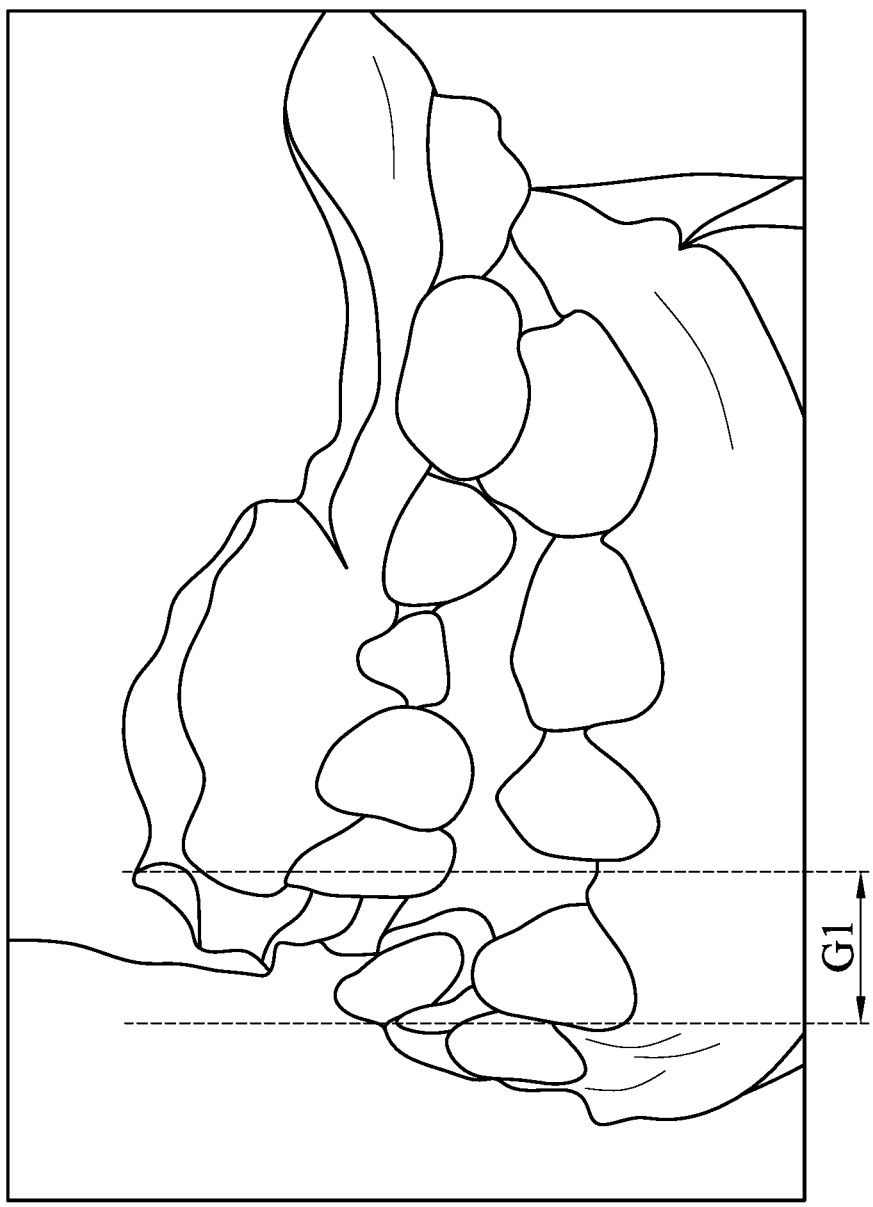
FIG. 1A is a side view of the before-treatment teeth model of an adult patient with severe Class III malocclusion.
Figure 4:
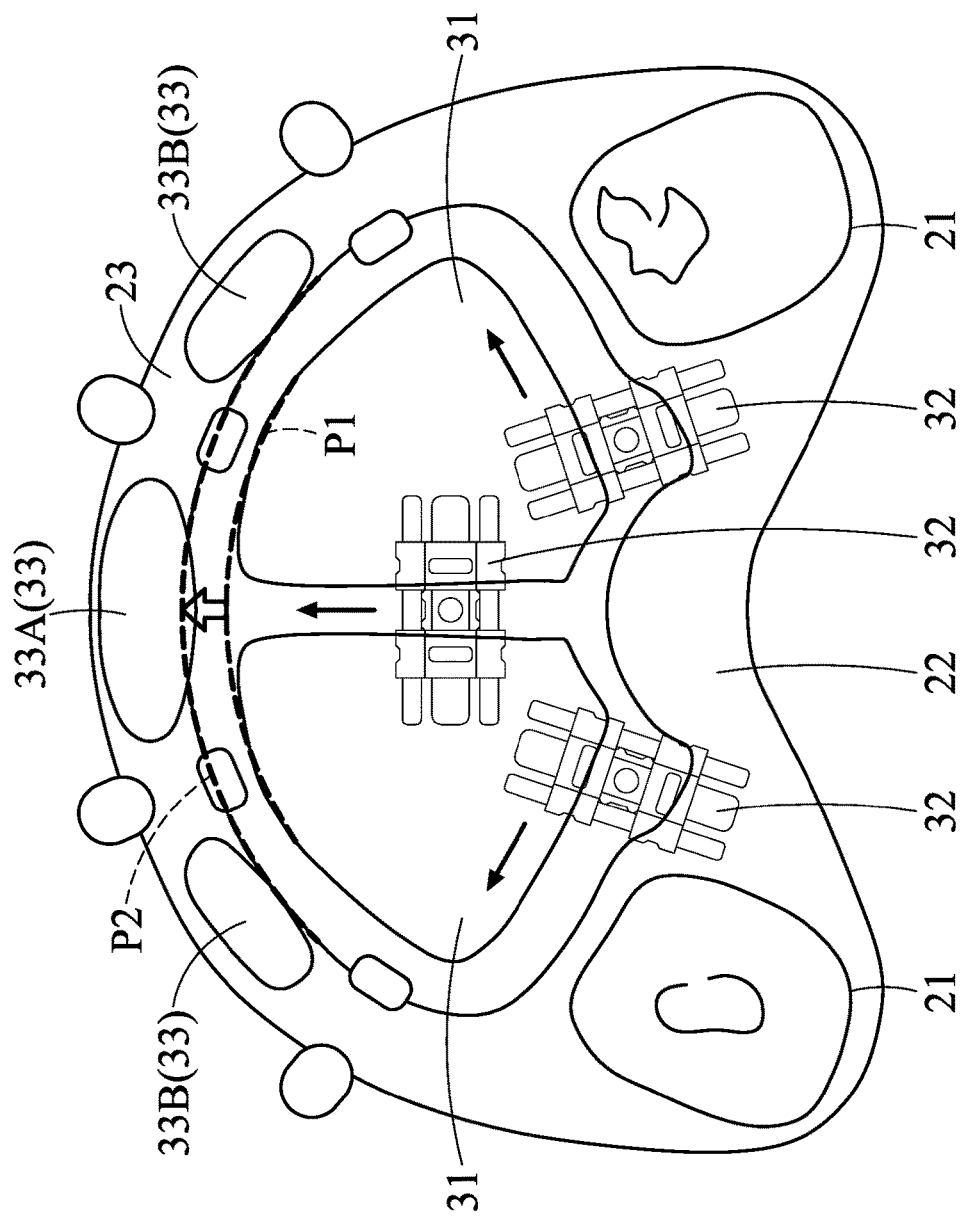
FIG. 4 is a schematic bottom view of an orthodontic device in accordance with some embodiments of the present disclosure, illustrating the orthodontic function of the orthodontic device.

In terms of function, the anchorage structure 20 is based on the posterior teeth to provide an anchorage. By adjusting the expansion screws 32, a biasing force is applied on the anterior teeth parts 31 to push the anterior teeth anteriorly and outwardly to expand the maxilla, as indicated by the small arrows in FIG. 4. As shown in FIG. 4, the inner dashed line P1 marks the initial positions of the anterior teeth/anterior teeth parts 31, and the outer dashed line P2 marks the target positions of the anterior teeth/anterior teeth parts 31. Also, the expanded arch 23 is configured to have a shape and relatively forward advancing position such that its lingual edge (e.g., the inner edge shown) conforms to the shape and position of the outer dashed line P2 shown in FIG. 4. Thus, one function of the expanded arch 23 is to define the target positions for the anterior teeth parts 31. As the maxilla is expanded, the anterior teeth parts 31 are gradually moved anteriorly and outwardly by adjusting the expansion screws 32 until the expansion movement (as indicated by the large arrow in FIG. 4) is stopped by the lingual edge of the expanded arch 23. When the maxillary anterior teeth reach the target position, the horizontal gap G1 of Class III malocclusion as shown in FIG. 1A is eliminated.

Figure 5:
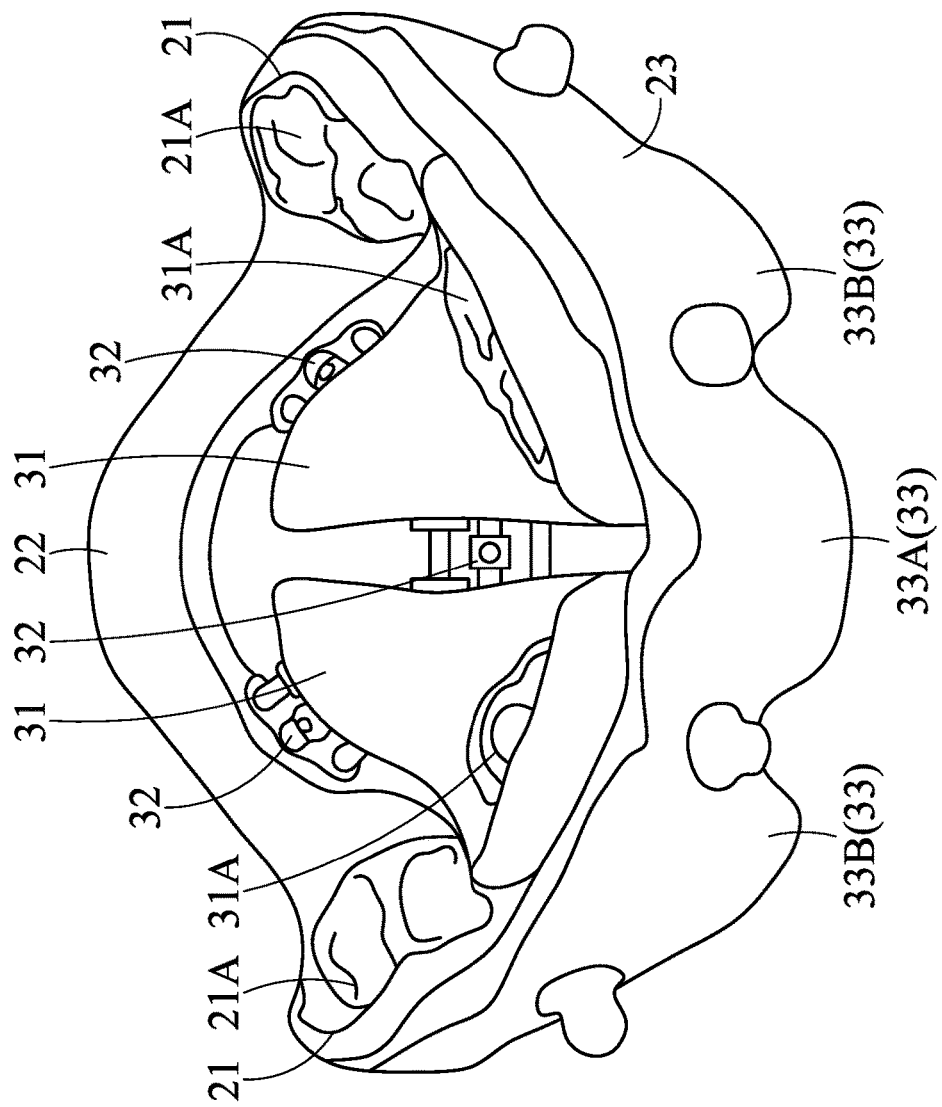
FIG. 5 is a schematic oblique top view of an orthodontic device in accordance with some embodiments of the present disclosure.

FIG. 5 shows an oblique top view of the same orthodontic device 10. As shown in FIG. 5, each anterior teeth part 31 is shaped to conform to the shape of the palate. Also, the palatal bar 22 is configured in an arch shape (see also FIG. 6) to conform to the shape of the palate and to increase the strength and wearing stability of the anchorage structure 20.

Figure 6:
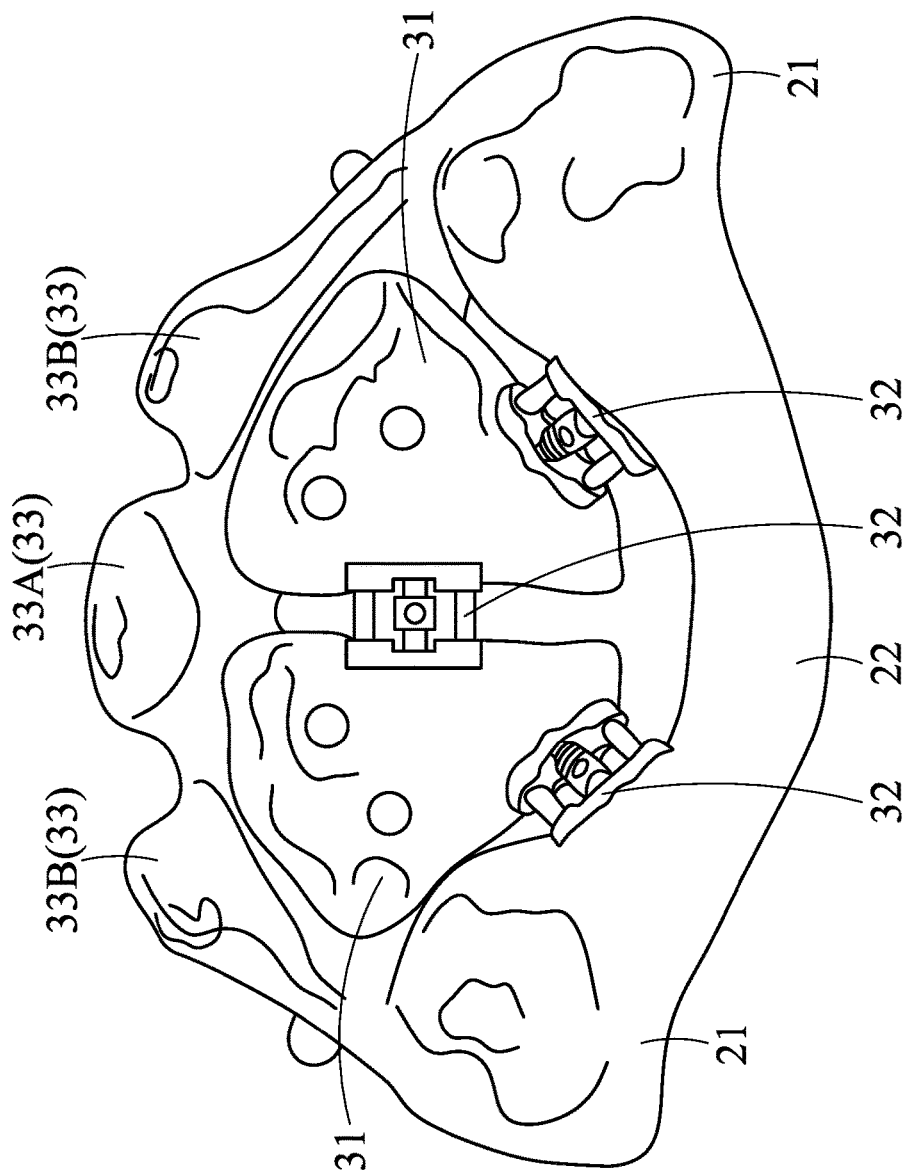
FIG. 6 is a schematic oblique bottom view of an orthodontic device in accordance with some embodiments.
Figure 7:
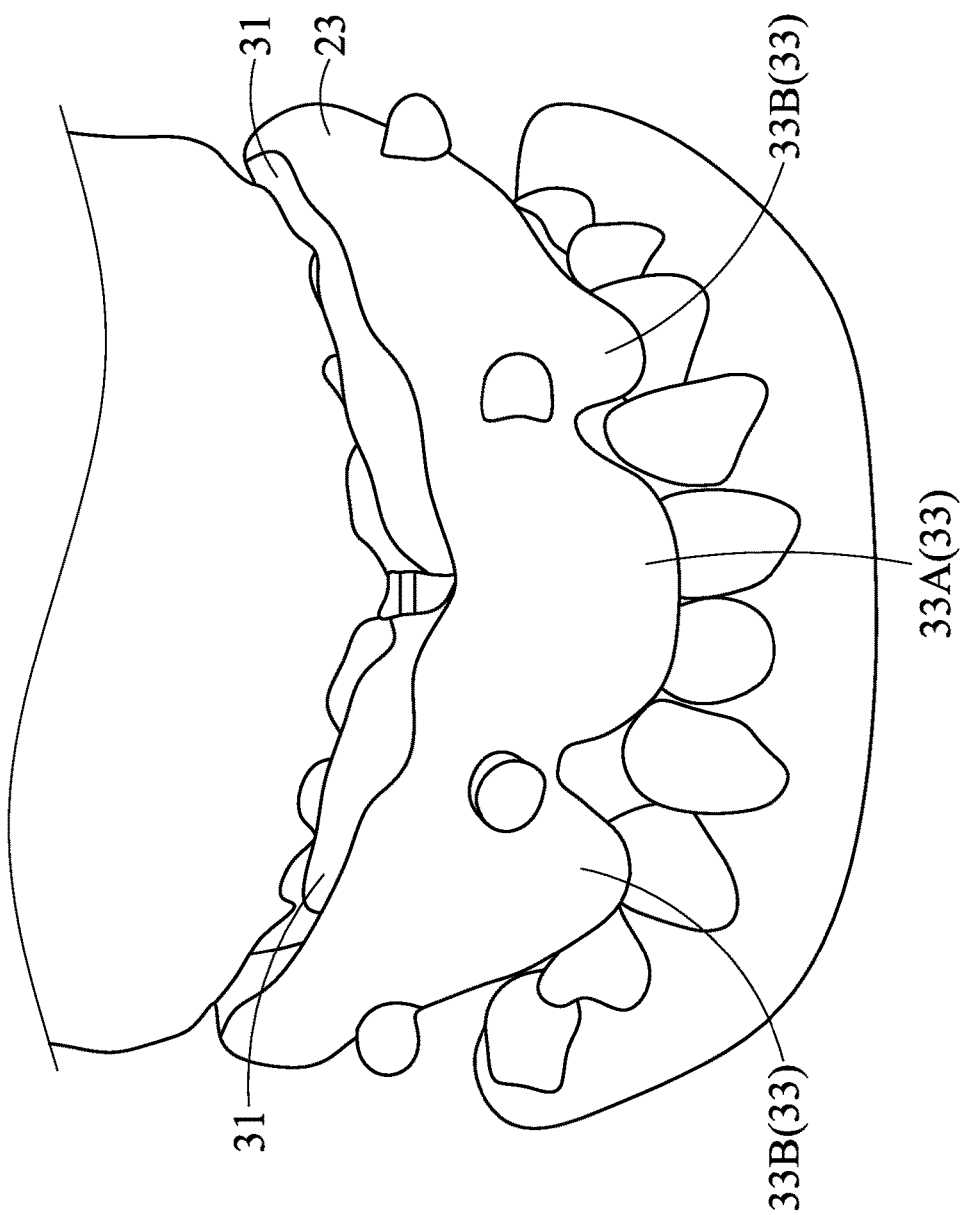
FIG. 7 is a front view illustrating an orthodontic device in accordance with some embodiments of the present disclosure being worn on the maxillary dental arch, where the incisor guidance protrusion and lateral protrusions of the orthodontic device contact the lower incisors and canines, respectively.

In some embodiments, additional structural features 33 (e.g., protrusions) are added to the expanded arch 23. As shown in FIG. 6 (which shows an oblique bottom view of the same orthodontic device 10), an incisor guidance protrusion 33A and two lateral protrusions 33B are added to the occlusal side (e.g., the upper side shown) of the expanded arch 23. The lingual surface (e.g., the inner surface shown) of the incisor guidance protrusion 33A is configured to contact the lower incisors. Similarly, the lingual surfaces (e.g., the inner surfaces shown) of the lateral protrusions 33B are configured to contact the lower canines. A front view of the same orthodontic device 10 worn on the maxilla dental arch of a teeth model is shown in FIG. 7, which illustrates the incisor guidance protrusion 33A and lateral protrusions 33B contact the lower incisors and canines, respectively. Accordingly, the incisor guidance protrusion 33A and lateral protrusions 33B act to relieve protective muscle splinting, thereby facilitating the maxilla expansion movement driven by the expansion screws 32 and the mandibular retraction (which will be illustrated later). In addition, the contacting surfaces (e.g., the inner surfaces shown in FIG. 6) of the incisor guidance protrusion 33A, the lateral protrusions 33B and the occlusal sides (e.g., the upper sides shown in FIG. 6) of the posterior teeth caps 21 may also be configured with functional bevels as guiding surfaces for the lower teeth.

Figure 8:
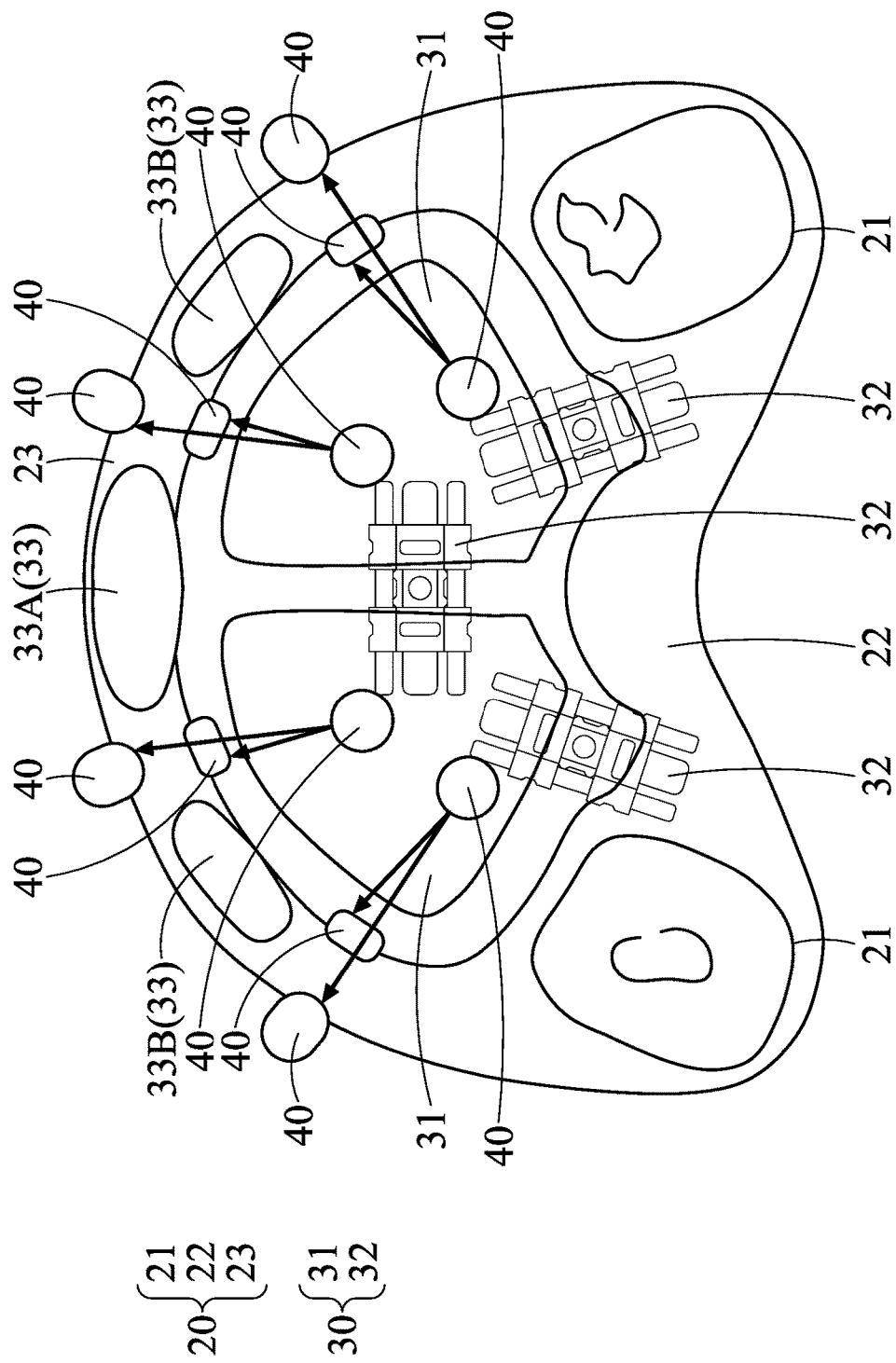
FIG. 8 is a schematic bottom view of an orthodontic device in accordance with some embodiments of the present disclosure, illustrating the location of connectors on the orthodontic device.

In some embodiments, connectors 40 (e.g., buttons or the like) are added to the expanded arch 23 and the anterior teeth parts 31 for connecting elastics (e.g., rubber bands). FIG. 8 shows the locations of connectors 40 on the same orthodontic device 10 in accordance with some embodiments. As shown in FIG. 8, connectors 40 (for simplicity, only represented by circles or ellipses) are attached to the labial side (e.g., the outer side shown) and lingual side (e.g., the inner side shown) of the expanded arch 23, and the bottom surfaces (e.g., the upper surfaces shown) of the anterior teeth parts 31. In some embodiments, elastics (not shown) connect connectors 40 on the expanded arch 23 with connectors 40 on the anterior teeth parts 31 to impart forces (as indicated by the arrows in FIG. 8) for maxillary expansion.

In some embodiments, elastics connect connectors 40 on the expanded arch 31 with connectors fixed on the lower teeth or the lower retainer (if any) on the lower teeth to impart forces for mandibular retraction. Accordingly, it can achieve palatal expansion (driven by the expansion screws 32) and mandibular retraction (driven by the elastic forces exerted by the elastics) at the same time, reducing treatment time.

Again, it is important to emphasize that the protective muscle splinting can be relieved by providing the incisor guidance protrusion 33A and lateral protrusions 33B to contact the lower teeth, thereby facilitating the maxilla expansion and the mandibular retraction. Otherwise, the protective muscle splinting restricts the movement of the lower jaw.

Figure 9:
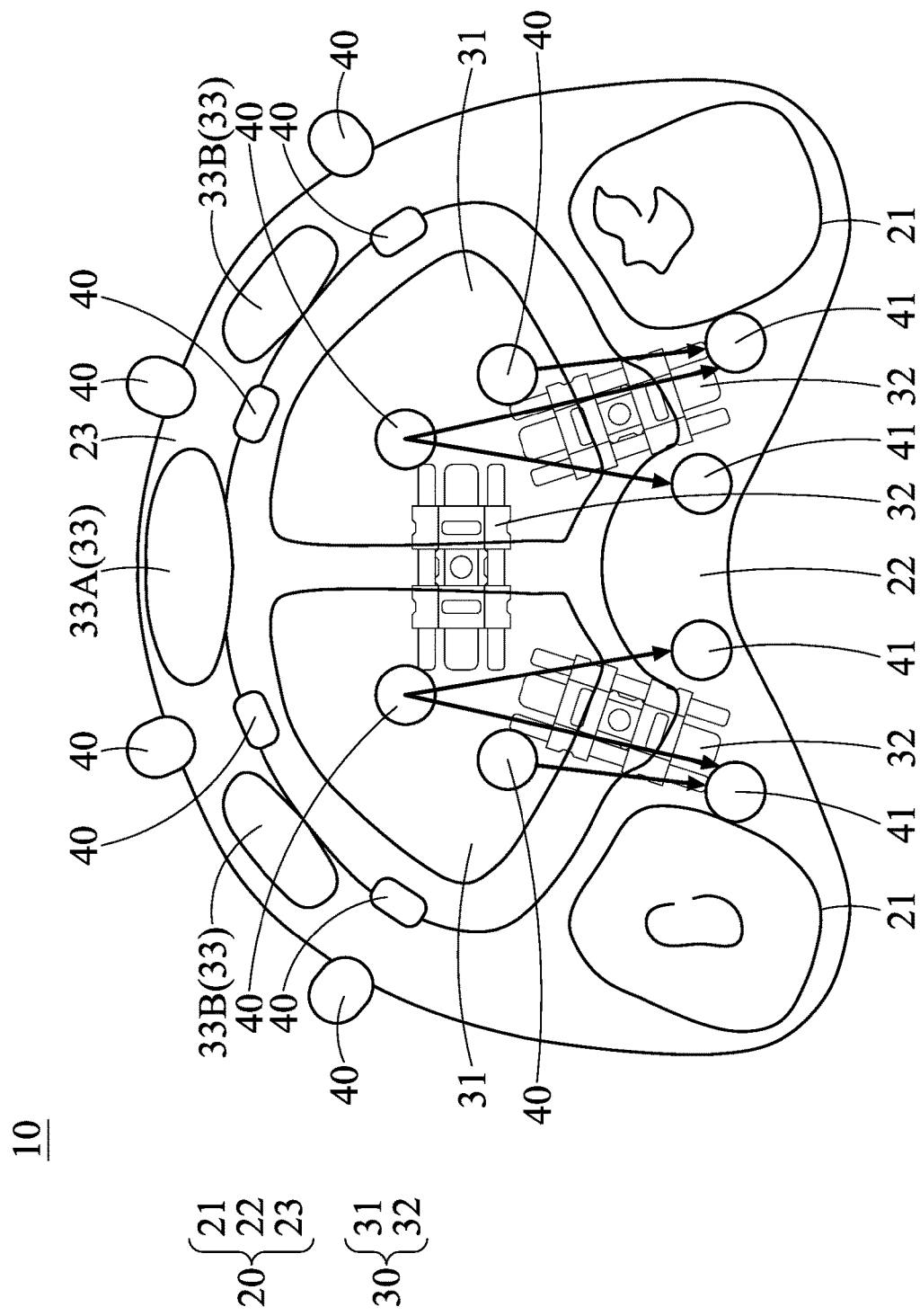
FIG. 9 is a schematic bottom view of an orthodontic device in accordance with some embodiments of the present disclosure, illustrating the location of connectors on the orthodontic device.

In some embodiments, the expansion screws 32 can be operated in reverse to impart forces on the anterior teeth parts 31 for anterior maxillary teeth retraction (according to the actual needs of different patients). In such cases, additional connectors 41 (for simplicity, only represented by circles) can be added to the bottom side (e.g., the upper side shown) of the palatal bar 22, as shown in FIG. 9. Elastics (not shown) connecting connectors 40 on the anterior teeth parts 31 with connectors 41 on the palatal bar 22 impart forces (as indicated by the arrows in FIG. 9) for anterior maxillary teeth retraction.

Figure 1B:
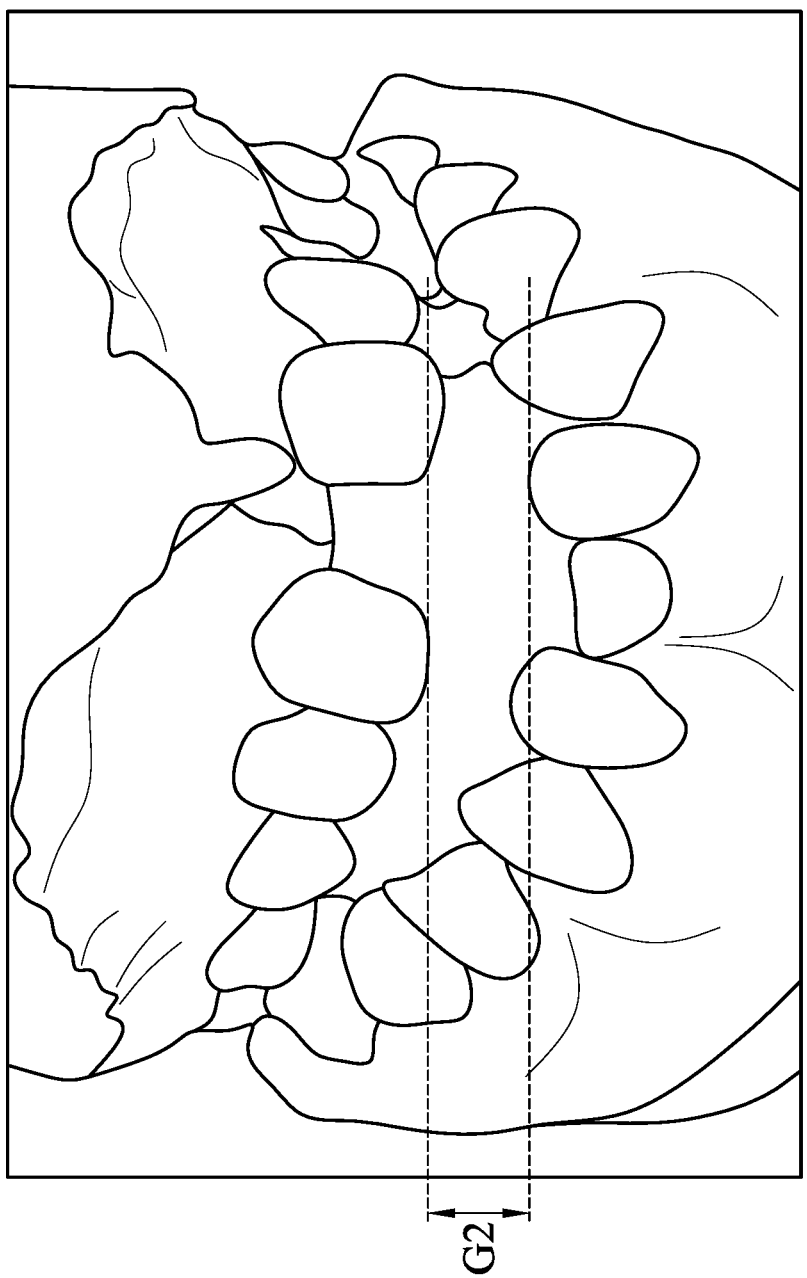
FIG. 1B is a front view of the before-treatment teeth model of an adult patient with severe Class III malocclusion.

In some embodiments, elastics (not shown) connecting connectors 40 on the anterior teeth parts 31 with connectors 41 on the palatal bar 22 impart forces to pull down the anterior maxillary teeth vertically toward an occlusal plane (i.e., to eliminate the vertical gap G2 of Class III malocclusion as shown in FIG. 1B).

Once the horizontal gap G1 and vertical gap G2 as shown in FIGS. 1A and 1B are both eliminated, a proper occlusion between the upper and lower jaws can be achieved, i.e., the Class III malocclusion is cured.

In summary, the embodiments of the present disclosure have some advantageous features. By providing one or more structural features (e.g., protrusions) on the expanded arch, it can relieve protective muscle splinting, thereby facilitating the maxilla expansion movement and the mandibular retraction. Also, the orthodontic device provided can expand the maxilla anteriorly and outwardly and retract the mandible at the same time to reduce treatment time. Therefore, surgery is no longer necessary to treat severe Class III malocclusion.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An orthodontic device, comprising:
an anchorage structure, comprising:
a left posterior teeth cap and a right posterior teeth cap configured to be removably worn on left and right posterior teeth of a patient's maxillary dental arch, respectively;
a palatal bar connecting the left posterior teeth cap and the right posterior teeth cap and configured to contact the patient's palate; and
an expanded arch fixedly connected to the left and right posterior teeth caps and extending from the left posterior teeth cap to the right posterior teeth cap;
a palatal expansion structure, comprising:
a left anterior teeth part and a right anterior teeth part configured to be removably worn on left and right anterior teeth of the patient's maxillary dental arch, respectively; and
a plurality of expansion screws connecting the left anterior teeth part and the right anterior teeth part to each other and to the palatal bar,
wherein the left and right posterior teeth caps, the palatal bar and the expanded arch transversely enclose the palatal expansion structure, and wherein the expanded arch is physically separated from left and right anterior teeth of the patient's maxillary dental arch covered by the left and right anterior teeth parts when the orthodontic device is worn; and
at least one protrusion formed on an occlusal side of the expanded arch and configured to contact the patient's mandibular dental arch when the orthodontic device is worn.

2. The orthodontic device as claimed in claim 1, wherein each of the left and right anterior teeth parts is movable between an initial position and a target position under forces driven by the expansion screws, and the expanded arch is configured to have a shape and relative position such that a lingual edge of the expanded arch contacts front edges of the left and right anterior teeth parts at the target positions.

3. The orthodontic device as claimed in claim 2, wherein the left and right anterior teeth parts are moved anteriorly and outwardly from the initial positions under the forces driven by the expansion screws, and the expanded arch is configured to stop the left and right anterior teeth parts at the target positions.

4. The orthodontic device as claimed in claim 1, wherein the left and right posterior teeth caps, the palatal bar and the expanded arch are integrally formed in one piece.

5. The orthodontic device as claimed in claim 1, wherein the expanded arch is located at the same elevation as the left and right posterior teeth caps.

6. The orthodontic device as claimed in claim 1, wherein the at least one protrusion comprises an incisor guidance protrusion that is formed on the expanded arch and configured to contact incisors of the patient's mandibular dental arch when the orthodontic device is worn.

7. The orthodontic device as claimed in claim 1, wherein the at least one protrusion comprises two lateral protrusions that are formed on the expanded arch and configured to contact left and right canines of the patient's mandibular dental arch when the orthodontic device is worn.

8. The orthodontic device as claimed in claim 1, further comprising a plurality of connectors provided on the expanded arch and the left and right anterior teeth parts, wherein the connectors on the expanded arch and the left and right anterior teeth parts are used for connecting elastics to provide forces to drive the left and right anterior teeth parts.

9. The orthodontic device as claimed in claim 1, further comprising a plurality of connectors provided on the expanded arch, wherein the connectors on the expanded arch are used for connecting elastics coupled to other connectors fixed on lower teeth to provide forces to drive the patient's mandibular dental arch.

10. The orthodontic device as claimed in claim 1, further comprising a plurality of connectors provided on the left and right anterior teeth parts and the palatal bar, wherein the connectors on the left and right anterior teeth parts and the palatal bar are used for connecting elastics to provide forces to drive the left and right anterior teeth parts.

11. An orthodontic device, comprising:
an anchorage structure, comprising:
a left posterior teeth cap and a right posterior teeth cap configured to be removably worn on left and right posterior teeth of a patient's maxillary dental arch, respectively;
a palatal bar connecting the left posterior teeth cap and the right posterior teeth cap and configured to contact the patient's palate; and
an expanded arch fixedly connected to the left and right posterior teeth caps and extending from the left posterior teeth cap to the right posterior teeth cap;
a palatal expansion structure, comprising:
a left anterior teeth part and a right anterior teeth part configured to be removably worn on left and right anterior teeth of the patient's maxillary dental arch, respectively; and
a plurality of expansion screws connecting the left anterior teeth part and the right anterior teeth part to each other and to the palatal bar, wherein the left and right posterior teeth caps, the palatal bar and the expanded arch transversely enclose the palatal expansion structure, and wherein the expanded arch is physically separated from left and right anterior teeth of the patient's maxillary dental arch covered by the left and right anterior teeth parts when the orthodontic device is worn; and an incisor guidance protrusion and two lateral protrusions formed on an occlusal side of the expanded arch and configured to contact incisors and left and right canines of the patient's mandibular dental arch, respectively, when the orthodontic device is worn.

12. The orthodontic device as claimed in claim 11, wherein contacting surfaces of the incisor guidance protrusion and the lateral protrusions are configured with guiding surfaces for lower teeth.

13. The orthodontic device as claimed in claim 12, wherein the left and right posterior teeth caps are configured to contact the left and right posterior teeth of the patient's mandibular dental arch, respectively, when the orthodontic device is worn, and contacting surfaces of the left and right posterior teeth caps are also configured with guiding surfaces for the lower teeth.

14. The orthodontic device as claimed in claim 11, wherein each of the left and right anterior teeth parts is movable between an initial position and a target position under forces driven by the expansion screws, and the expanded arch is configured to stop the left and right anterior teeth parts at the target positions.

15. The orthodontic device as claimed in claim 11, wherein the anchorage structure and the left and right anterior teeth parts are made of orthodontic resin.

\* \* \* \* \*